(12) United States Patent
Formanski et al.

(10) Patent No.: US 11,251,448 B2
(45) Date of Patent: Feb. 15, 2022

(54) METHOD FOR DETERMINING THE SEALING TIGHTNESS OF A FUEL CELL STACK

(71) Applicant: Bayerische Motoren Werke Aktiengesellschaft, Munich (DE)

(72) Inventors: Volker Formanski, Ismaning (DE); Norbert Frisch, Planegg (DE); Martin Thomas, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 132 days.

(21) Appl. No.: 16/506,721

(22) Filed: Jul. 9, 2019

(65) Prior Publication Data

US 2019/0334186 A1 Oct. 31, 2019

Related U.S. Application Data

(63) Continuation of application No. PCT/EP2017/082256, filed on Dec. 11, 2017.

(30) Foreign Application Priority Data

Jan. 10, 2017 (DE) .................... 10 2017 200 307.3

(51) Int. Cl.
*H01M 8/04* (2016.01)
*H01M 8/0438* (2016.01)
*H01M 8/04225* (2016.01)
*H01M 8/0271* (2016.01)

(52) U.S. Cl.
CPC ..... *H01M 8/04432* (2013.01); *H01M 8/0271* (2013.01); *H01M 8/04225* (2016.02)

(58) Field of Classification Search
CPC ........ H01M 8/04432; H01M 8/04225; H01M 8/0271
See application file for complete search history.

(56) References Cited

U.S. PATENT DOCUMENTS

| 7,127,937 | B1 | 10/2006 | Thyroff |
| 7,678,477 | B2 | 3/2010 | Yu |
| 2009/0239105 | A1* | 9/2009 | Yoshida ............ H01M 8/04432 429/424 |

FOREIGN PATENT DOCUMENTS

| DE | 196 49 434 C1 | 1/1998 |
| DE | 10 2006 025 125 A1 | 12/2006 |
| DE | 10 2007 059 996 A1 | 7/2008 |
| DE | 10 2015 205 508 A1 | 9/2016 |

(Continued)

OTHER PUBLICATIONS

PCT/EP2017/082256, International Search Report dated Feb. 12, 2018 (Two (2) pages).

(Continued)

*Primary Examiner* — Jimmy Vo
(74) *Attorney, Agent, or Firm* — Crowell & Moring LLP

(57) ABSTRACT

A method for determining a sealing tightness of a fuel cell stack includes providing of fuel into a cathode space, sealed off gas-tight against further components of a cathode subsystem, formed at least partly by the fuel cell stack, and detecting of a value which is indicative of a pressure change in the cathode space, where a cathode test pressure in the cathode space is higher than a pressure outside the fuel cell stack.

11 Claims, 2 Drawing Sheets

(56) References Cited

FOREIGN PATENT DOCUMENTS

DE   10 2015 008 293 A1   12/2016
EP        2 221 907 A1    8/2010

OTHER PUBLICATIONS

German Search Report issued in German counterpart application No. 10 2017 200 307.3 dated Oct. 5, 2017, with Statement of Relevancy (Nine (9) pages).

* cited by examiner

METHOD FOR DETERMINING THE SEALING TIGHTNESS OF A FUEL CELL STACK

CROSS REFERENCE TO RELATED APPLICATIONS

This application is a continuation of PCT International Application No. PCT/EP2017/082256, filed Dec. 11, 2017, which claims priority under 35 U.S.C. § 119 from German Patent Application No. 10 2017 200 307.3, filed Jan. 10, 2017, the entire disclosures of which are herein expressly incorporated by reference.

BACKGROUND AND SUMMARY OF THE INVENTION

The technology disclosed here relates to a method for determining the sealing tightness of a fuel cell stack as well as a method for starting a fuel cell system. Fuel cell systems are known in themselves.

The drawback of the previously known solution is that a so-called oxygen/hydrogen front may form at times during the starting of the fuel cell system, which may result in a degradation of the fuel cells. Moreover, there is a need to check the sealing tightness of the fuel cell stack with simple means in a relatively reliable manner, as well as that of other components, preferably without this delaying the start-up of the fuel cell system.

In order to minimize the degradation of the fuel cell stack, the oxygen in the stack is consumed upon shut-off of the fuel cell system. One usual way of doing this is to pressurize the anode with hydrogen during the parking period. However, there is no possibility of deliberately pressurizing the cathode with hydrogen through the membrane. Instead, one must wait for a rather long time until hydrogen arrives at the cathode side through the crossover. Accordingly, the system is sluggish. This pressurization during the parking period may be relative costly and thus be relatively prone to error and may require a comparatively great amount of energy. Moreover, the vehicle driver might not be in the vicinity and might not notice any warnings put out during malfunction.

One preferred problem to be solved by the technology disclosed here is to lessen or eliminate at least one drawback of the already known solutions. In particular, a preferred problem to be solved is to detect any leakage safely and expediently also promptly and/or to lessen the degradation of the fuel cells during the parking period more simply and also preferably in a more energy-efficient manner. Further preferred problems to be solved may emerge from the advantageous effects of the technology disclosed here.

The technology disclosed here relates to a method for determining the sealing tightness of a fuel cell stack of a fuel cell system.

The technology disclosed here relates in particular to a method for a fuel cell system having at least one fuel cell and a fuel cell system designed for the method. The fuel cell system is intended for example for mobile applications such as motor vehicles, especially for the providing of energy for at least one drive machine for the propulsion of the motor vehicle. In its most simple form, a fuel cell is an electro-chemical energy transformer, which transforms fuel and oxidizing agent into reaction products, thereby producing electricity and heat. The fuel cell comprises an anode and a cathode, which are separated by an ion-selective or ion-permeable separator. The anode is supplied with fuel. Preferred fuels are hydrogen, low-molecular alcohol, bio-fuels, or liquefied natural gas. The cathode is supplied with oxidizing agent. Preferred oxidizing agents are air, oxygen, and peroxides, for example. The ion-selective separator may be designed for example as a proton exchange membrane (PEM). Preferably, a cation-selective polymer electrolyte membrane will be used. Materials for such a membrane are, for example, Nafion®, Flemion® and Aciplex®.

A fuel cell system comprises, along with the at least one fuel cell, peripheral system components (BOP components) which may come into use during operation of the at least one fuel cell. A plurality of fuel cells are generally combined to form a fuel cell stack.

The fuel cell system comprises an anode subsystem, which is formed by the fuel-carrying components of the fuel cell system. An anode subsystem may comprise at least one pressurized tank, at least one tank shutoff valve (=TAV), at least one pressure reducer, at least one anode feed line leading to the anode inlet, an anode space A in the fuel cell stack formed by the fuel cell stack at least for a portion, at least one anode exhaust gas line leading away from the anode outlet, at least one water separator (=AWS), at least one anode purge valve (=APV), at least one active or passive fuel recirculation feed (=ARE or ARB) and/or at least one recirculation line as well as further elements. The main task of the anode subsystem is to bring up and distribute fuel to the electrochemically active surfaces of the anode space and to take away the anode exhaust gas. The anode subsystem can moreover have stack shutoff valves at the anode side. The anode-side stack shutoff valves are designed to shut off the anode space and optionally further components with respect to a fuel source, generally at least one pressurized tank, and with respect to further components of the fuel cell system, such as the cathode subsystem, by means of an anode purge valve.

The fuel cell system comprises a cathode subsystem. The cathode subsystem is formed by the component carrying the oxidizing agent. A cathode subsystem may comprise at least one oxidizing agent feed, at least one cathode feed line leading to the cathode inlet, at least one cathode exhaust gas line leading away from the cathode outlet, a cathode space K formed at least for a portion by the fuel cell stack, cathode-side stack shutoff valves and further elements. The main task of the cathode subsystem is to bring up and distribute the oxidizing agent to the electrochemically active surfaces of the cathode space and to take away the oxidizing agent.

The method disclosed here involves the steps:
providing of fuel into a cathode space, sealed off gas-tight against further components of a cathode subsystem, formed at least partly by the fuel cell stack; and preferably
detecting of at least one value which is indicative of a pressure change in the cathode space, whereby the pressure is detected in consideration of a cathode test pressure in the cathode space which is higher than the pressure outside the fuel cell stack.

Preferably, the cathode space which is sealed off gas-tight against the further components of the cathode subsystem (hereinafter, for simplicity, the "gas-tight cathode space" or the "cathode space") is formed by the fuel cell stack and cathode-side stack shutoff valves arranged in or immediately adjacent to the fuel cell stack. Immediately adjacent to the fuel cell stack means in this context that no further system components of the fuel cell system are provided between the respective shutoff valve and the fuel cell stack. An exception to this is an emerging point for a later-mentioned fuel feed line. Especially advantageously, the line lengths between the cathode-side stack shutoff valves and the fuel cell stack are short as compared to the other line lengths of the cathode subsystem. For example, the line lengths between the cathode-side stack shutoff valves and the fuel cell stack may be less than 15%, less than 10% or less than 5% of the overall line length of the cathode subsystem. Gas-tight means in this context that the leakage through the stack shutoff valves or through the stack seals is negligibly slight. The further components of the cathode subsystem are all components of the cathode subsystem which are not part of the gas-tight cathode space. Hence, the cathode-side stack shutoff valves separate the gas-tight cathode space from the rest of the cathode subsystem. The cathode-side stack shutoff valves are preferably closed at least during the detecting of the pressure change and preferably also during and/or after the providing of fuel in the cathode space. Especially preferably, the cathode-side stack shutoff valves may be designed fuel-tight. In previously known solutions, relatively low tightness requirements are placed on the tightness of the cathode-side stack shutoff valves.

Providing of fuel does not mean in particular that the fuel gets from the anode sides of the fuel cells across the ion-selective separators of the fuel cells to the cathode sides of the fuel cells, for example in that the fuel flows through membrane openings, or diffuses through the membrane. In particular, the fuel may be supplied to the cathode space across a fuel feed line emerging into the cathode space. The fuel feed line may emerge directly in the fuel cell stack or between fuel cell stack and the cathode-side stack shutoff valves. Especially preferably, the fuel feed line is an anode purge line which is fluidically connected to the anode purge valve of the anode subsystem and emerges into the fuel cell stack or upstream and/or downstream of the fuel cell stack into the gas-tight cathode space.

In particular, the anode subsystem may be connected across at least one fuel feed line to the cathode space in such a way that a pressure equalization occurs between the anode space and the cathode space across this at least one fuel line. Advantageously, this pressure equalization takes place rather quickly between cathode and anode, without a gas exchange having to first occur through the membrane. Thus, the tightness check can be done more quickly. In particular, the cathode space and the anode space are fluidically connected across the at least one fuel feed line in such a way that fuel can flow from the anode space into the cathode space as long as the fluidic connection is not interrupted by a valve. In particular, this pressure exchange may occur:

during and/or after the providing of fuel in the cathode space; and/or during the detecting of the pressure change.

Especially preferably, a constant pressure equalization may occur between the anode space and the cathode space during the detecting of the pressure change. Advantageously, the cathode-side stack shutoff valves are closed in this case. In addition, at the same time the anode-side stack shutoff valve which blocks the flow path to the fuel source is preferably closed. In this way, no additional fuel can get into the anode subsystem downstream from the closed stack shutoff valve and at the same time no further oxidizing agent can flow into the gas-tight cathode space. This prevents pressure changes resulting from chemical reactions in the cathode space and anode space.

According to the technology disclosed here, at least as much fuel can be provided or introduced into the gas-tight cathode space prior to detecting the pressure change that the entire oxidizing agent present in the gas-tight cathode space can be chemically converted. For example, in a PEM fuel cell, hydrogen and the oxygen of air would be converted here into water in the gas-tight cathode space. Advantageously, this reaction can occur prior to the start of detecting the pressure change.

The detecting of at least one value which is indicative of a pressure change in the cathode space may be achieved in various ways. For example, the pressure change may be determined directly or indirectly from the pressure in the cathode space. It is conceivable, for example, to determine other quantities which are directly correlated with the pressure. The pressure change may be represented by a detected pressure difference between a cathode test pressure and an actually measured pressure or also it may be the actually measured pressure itself. These values may be determined after a certain time, such as 5 seconds, 10 seconds, 15 seconds, 20 seconds, 25 seconds, 30 seconds, 1 minute or 2 minutes. These values may also preferably be determined continuously or intermittently over a certain period of time.

The test pressure for the cathode space and/or anode space, especially the cathode test pressure in the cathode space and the anode test pressure disclosed here, is generally chosen such that it is higher than the pressure outside the cathode space, especially outside the fuel cell stack or the fuel cell system. Preferably, the cathode test pressure is greater than the surrounding pressure. For example, the test pressure may have a value of around 50 kPa to around 500 kPa above the ambient pressure or atmospheric pressure, preferably a value of around 100 kPa to around 300 kPa above the ambient pressure or atmospheric pressure. For example, the test pressure may be around 50 kPa, 100 kPa, 150 kPa or 200 kPa above the ambient pressure or atmospheric pressure.

At least at the start of the detecting of the pressure change, the pressures in the anode space and in the cathode space may be set such that the pressure in the anode space substantially corresponds to the pressure in the cathode space. "Substantially" means in this context that the difference between the pressures in the cathode space and anode space is negligible for the tightness testing or it may be unavoidable due to the system layout.

The technology disclosed here moreover involves the step whereby anode-side stack shutoff valves are closed after the pressure equalization, and whereby at least one value is detected which is indicative of a pressure change in the anode space. Values indicative of the pressure change in the anode space may be the same values as are used for the cathode space, i.e., pressure values or pressure differences which can be detected directly or indirectly. Likewise, the anode test pressure in the anode space is higher than the pressure in the rest of the anode subsystem or fuel cell system. The anode test pressure in particular is higher than the ambient pressure or atmospheric pressure. Preferably, the anode test pressure has the same or similar values to the cathode test pressure. In an especially preferred embodiment, the cathode test pressure is equal to the anode test pressure.

The detecting of the value which is indicative of the pressure change can be done by making a nominal vs. actual comparison i) between the cathode test pressure and the pressure actually detected in the cathode space after a definite time has elapsed; and/or ii) between the anode test pressure and the pressure actually detected in the anode space after a definite time has elapsed.

Advantageously, the tightness of the cathode space can thus be analyzed separately from the anode space. In this way, the leakage can be localized more accurately.

The method disclosed here can moreover involve the step whereby, with an anode purge valve closed and cathode-side stack shutoff valves closed, the anode space is subjected to a greater pressure than the cathode space, and wherein at least one value which is indicative of a pressure change in the anode space is detected directly or indirectly. Once again, the already discussed values may be used for this. In this way, it can also be tested to see whether leaky ion-permeable separators are present in the fuel cell stack or whether the anode purge valve is leaking. Especially preferably, this step may be done prior to introducing fuel into the cathode space or before the pressure equalization between cathode space and anode space.

Especially preferably, the tightness is checked during a phase when the motor vehicle is not in use. Preferably, the tightness is checked before a predicted use of the motor vehicle, for example, 10 minutes or 20 minutes or 30 minutes or 1 hour before a predicted use. In this way, the starting time can be shortened if the tightness has already been checked when a user wishes to start the motor vehicle.

Alternatively or additionally, the tightness check may also be done directly after the start of the period of non-use, for example as part of a shutdown procedure of the fuel cell system or directly after the fuel cell system has been powered down. Advantageously, a user of the motor vehicle is notified as to any leakage at a time when he is still in the vicinity of the motor vehicle. Especially advantageously, the cathode space can be made inert at the same time. Thus, the probability of a hydrogen/oxygen front being formed in the anode space during the next activation of the fuel cell system can be at least decreased.

Moreover, the fuel used for the tightness test is used at the same time to make the cathode space inert.

A phase of use of the motor vehicle is a phase in which a user of the motor vehicle is (actively) using the motor vehicle. Hence, for example, it is the driving operation of the motor vehicle by the user or (partly) autonomously.

A phase of non-use of the motor vehicle is therefore an inactive phase of the motor vehicle in regard to its propulsion. In other words, the phase of non-use is, for example, a (lengthy) period of time during which the motor vehicle does not actively receive any (driving) instruction from the user requiring the operating of the fuel cell or the motor vehicle. This is the case, for example, when a motor vehicle is parked. In this phase of non-use of the motor vehicle, however, an autarchic operation of the fuel cell system may occur, for example:

in order to avoid or lessen irreversible damage to the fuel cell system due to certain fuel-consuming functions of the motor vehicle (=protective functions; e.g., operating of the fuel cell system for the converting of blow-off gas of a cryogenic pressurized tank); and/or to prepare for preconditioning or comfort functions of the motor vehicle for the next use of the motor vehicle (e.g., air conditioning of the passenger compartment, charging of the electrical energy accumulator, etc.).

It may likewise be provided that the tightness check is part of the autarchic operation or comes directly after it.

Methods for predicting the time of use of the motor vehicle are known both for the operation of a fuel cell system and for the operation of other components of a motor vehicle, for example, the preconditioning of a passenger compartment before the starting of the motor vehicle.

The technology disclosed here moreover involves a method for starting a fuel cell system. The method may involve the step whereby the fuel cell system is only started if the pressure change detected is less than a pressure change limit value. The pressure change or the pressure change limit value can be, for example, a pressure value or a differential pressure value.

The technology disclosed here moreover involves a method for lessening the degradation of a fuel cell stack. It involves the step whereby the fuel is provided in a cathode space sealed off gas-tight against further components of the cathode subsystem, formed at least partly by the fuel cell stack, wherein preferably at least as much fuel is provided in the cathode space that the entire oxidizing agent present in the cathode space can be converted. In other words, the providing of fuel in the gas-tight cathode space already in itself has benefits with regard to fuel cell degradation, without having to detect the pressure profile for this.

In other words, the technology disclosed here relates to a pressure maintaining method which can be performed during the starting or shutdown procedure. The mixing point for the anode purge gas is situated before the pressure holding valve (=backpressure valve or cathode-side stack shutoff valve downstream from the fuel cell) of the cathode exhaust gas line. Since the mixing point of the anode exhaust gas is thus likewise closed by the pressure holding valve, the safety can be further enhanced. The technology disclosed here makes it possible to deliberately pressurize the cathode or the cathode space K with hydrogen when the system is shut down. This enables longer service life of the system, without having to pressurize the anode once again, which is preferably avoided. In this way it is also possible to carry out a more accurate tightness test more quickly during the pressure holding, since the usual hydrogen crossover between anode and cathode is for the most part eliminated. Thus, pipe damage or leakage between the stack shutoff valves can be advantageously identified. Moreover, this method can also identify a leaky anode purge valve by pressure diagnosis. In particular, the pressure holding valve or pressure regulating valve may have a tighter design than traditional shutoff valves, which are only air-tight to a certain degree.

The technology disclosed here will now be explained with the aid of the figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 2:
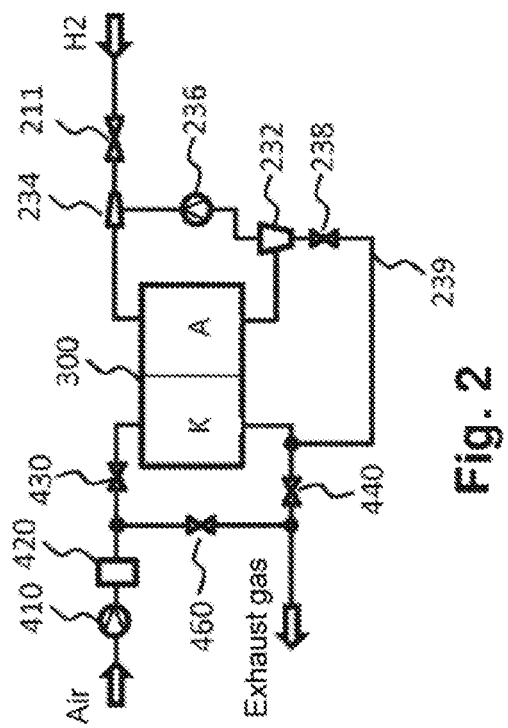
FIG. 2 is a schematic view of another fuel cell system.
Figure 1:
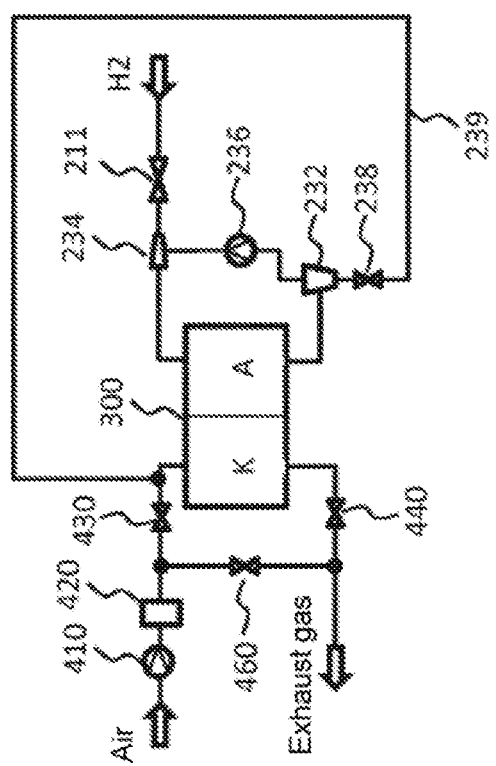
FIG. 1 is a schematic view of a fuel cell system.

FIG. 1 shows a fuel cell system which is designed to carry out the method disclosed here. Not shown in FIGS. 1 and 2 is the controller to carry out the method disclosed here. It is in particular a controller which can be designed to carry out the method disclosed here even during a phase of non-use of the motor vehicle.

The fuel cell stack 300 is divided here schematically into two parts, one part forming the anode space A and a second part forming the cathode space K. The fuel cell stack 300 is shown here greatly simplified. In actuality, the fuel cell stack 300 generally encompasses several hundred individual cells, each of which has a cathode and an anode, which are separated by an ion-permeable separator.

The cathode subsystem comprises:

an oxidizing agent feed 410, which draws in and compresses the oxidizing agent (here, air);

downstream from the oxidizing agent feed 410, an intercooler 420, which cools the compressed oxidizing agent;

a bypass 460, which branches off upstream from the fuel cell stack 300 and emerges into the exhaust gas line downstream from the fuel cell stack;

a first cathode-side stack shutoff valve 430 or cathode shutoff valve, which is arranged upstream from the fuel cell stack 300; and a second cathode-side stack shutoff valve 440, which is arranged downstream from the fuel cell stack 300.

The cathode-side stack shutoff valves 430, 440 are arranged directly adjacent to the fuel cell stack 300. An anode purge line 239, which begins here at an anode purge valve or purge valve 238, emerges between the first stack shutoff valve 430 and the fuel cell stack 300.

The anode purge valve 238 here is formed at or adjacent to the water separator 232. The anode purge valve 238 may also be called the anode-side stack shutoff valve 238 downstream from the fuel cell stack 300.

The anode subsystem here further comprises, among other things:

at least one fuel source (represented here by "H2");

at least one anode-side (first) stack shutoff valve 211, which is arranged upstream from the fuel cell stack 300 and is designed to interrupt the fluidic connection between the fuel source and the rest of the anode subsystem;

at least one ejector 234, which is designed to introduce the recirculated gas into the anode feed line; and at least one fuel recirculation feed, which is arranged in the recirculation line and delivers the gas being recirculated.

Likewise, the anode-side stack shutoff valve 211 can be provided immediately adjacent to the anode inlet of the fuel cell stack 300, especially in a design with no recirculation.

FIG. 2 shows a layout similar to FIG. 1. The difference is a fuel feed line 239, shown in FIG. 2, which emerges into the cathode space K downstream from the fuel cell stack 300.

What is common to both figures is the fact that the cathode-side stack shutoff valves 430, 440 together with a partial region of the fuel cell 300 form a cathode space K, which is separated gas-tight against the remaining components of the cathode subsystem. Likewise, the anode-side stack shutoff valves 211, 238 here form an anode space A together with a partial region of the fuel cell 300, which can be sealed off against other regions of the anode subsystem and/or the cathode subsystem. According to the embodiment shown here, the fluidic connection between the anode space A and the cathode space K can be interrupted by the anode purge valve 238.

Figure 3:
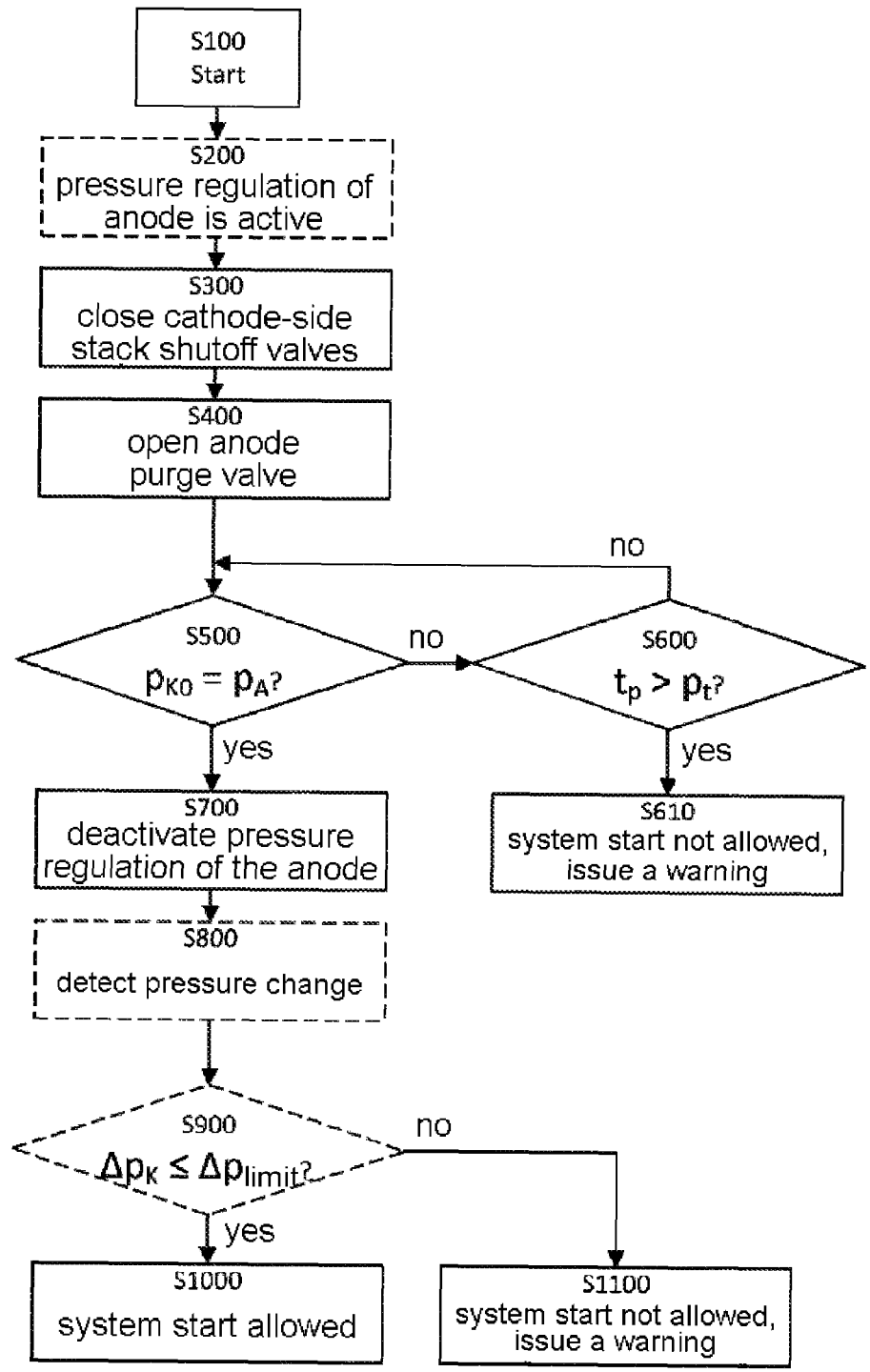
FIG. 3 is a schematic representation of a flow chart of a method disclosed here for determining the tightness of a fuel cell stack.

FIG. 3 shows schematically a configuration of the method disclosed here for the determining of the tightness of the fuel cell stack. The method starts with step S100. In step S200, a pressure regulation of the anode is activated. The pressure regulation of the anode regulates the pressure in the anode space A. In step S300, the cathode-side stack shutoff valves 430, 440 are closed. In step S400, the anode purge valve 238 is opened. Thus, the pressure equalization occurs between the anode space A and the cathode space K, whereupon the pressure regulation of the anode influences the pressure both in the anode space A and in the cathode space K on account of the fluidic connection via the fuel line 239. In step S500, a check is made to see whether the pressure in the cathode space K $p_{Ko}$ is equal to the pressure $p_A$ in the anode space A.

Preferably a pressure sensor is arranged for this purpose in the cathode space K and in the anode space A, and sends a signal representing the pressure in the corresponding space to a controller of the fuel cell system or the motor vehicle. If these pressures are not substantially identical, in step S600 a check is made to see whether a certain time-out or dead time $t_t$ for this pressure equalization has already elapsed. If this dead time has elapsed, it can be determined in step 610 that no system start is allowed. Alternatively or additionally, in step S610 a corresponding warning may be put out to the user or to a third party, such as a service control center. If the dead time has not yet elapsed, step S500 is repeated. If a pressure equilibrium has substantially been established between the cathode space K and the anode space A, the pressure regulation of the anode is deactivated in step S700. For this, the anode purge valve 211 may be closed, for example. In step S800, a pressure change in the cathode space K and possibly also in the anode space A is detected. The detecting of the pressure change may be done for example via a pressure sensor in the cathode space K or in the anode space A. Especially preferably, two pressure sensors are used, one pressure sensor detecting the pressure change in the cathode space K and the other pressure sensor detecting the pressure change in the anode space A. It may be provided for this that the anode purge valve 238 is closed during the detecting of the pressure change. The detecting of the pressure change may occur by performing a nominal vs. actual comparison between a test pressure, especially the cathode test pressure or the anode test pressure, and the pressures actually detected (respectively there) after a definite time has elapsed. Alternatively, this nominal vs. actual comparison may also be done continuously over a definite period of time. In step S900, a check is made to see whether the detected pressure difference $\Delta p_K$ is less than or equal to a still permissible limiting pressure difference. If so, then in step S1000 the system start of the fuel cell system is allowed. If no, then in step S1100 the system start is not allowed. Alternatively or additionally, a warning may be put out to a user or a third party.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a sealing tightness of a fuel cell stack, comprising the acts of:

providing of fuel into a cathode space, sealed off gas-tight against further components of a cathode subsystem, formed at least partly by the fuel cell stack, wherein an anode subsystem is connected across at least one fuel line to the cathode space such that the fuel flows from an anode space into the cathode space via the at least one fuel line and such that a pressure equalization occurs between the anode space and the cathode space across the at least one fuel line; and detecting of a value which is indicative of a pressure change in the cathode space, wherein a cathode test pressure in the cathode space is higher than a pressure outside the fuel cell stack.

2. The method according to claim 1, wherein, at least at a beginning of the detecting, a pressure in the anode space corresponds substantially to a pressure in the cathode space.

3. The method according to claim 1 further comprising the acts of closing anode-side stack shutoff valves after the pressure equalization occurs and detecting a value which is indicative of a pressure change in the anode space, wherein an anode test pressure in the anode space is higher than the pressure outside the fuel cell stack.

4. The method according to claim 1 further comprising the acts of closing an anode purge valve and cathode-side stack shutoff valves, subjecting the anode space to a greater pressure than the cathode space, and detecting a value which is indicative of a pressure change in the anode space.

5. The method according to claim 1, wherein at least as much fuel is provided in the cathode space such that an entire oxidizing agent present in the cathode space is converted.

6. The method according to claim 1, wherein cathode-side stack shutoff valves of the cathode subsystem are closed at least during the detecting and/or during the providing.

7. The method according to claim 1, wherein the fuel cell stack is used in a motor vehicle and wherein the sealing tightness is checked during a phase when the motor vehicle is not in use.

8. The method according to claim 1, wherein the fuel cell stack is used in a motor vehicle and wherein the sealing tightness is checked before a predicted use of the motor vehicle.

9. The method according to claim 1, wherein the fuel cell stack is used in a motor vehicle and wherein the sealing tightness is checked 10 minutes or 20 minutes or 30 minutes or 1 hour before a predicted use of the motor vehicle.

10. The method according to claim 1, wherein the detecting is done by making a nominal vs. an actual comparison:
   between the cathode test pressure and a pressure actually detected in the cathode space after a definite time has elapsed; and/or
   between an anode test pressure and a pressure actually detected in the anode space after the definite time has elapsed.

11. A method for starting a fuel cell system, comprising the acts of:
   determining the sealing tightness according to claim 1, wherein the fuel cell system is only started if the pressure change is less than a pressure change limit value.

\* \* \* \* \*